Patented Dec. 11, 1923.

1,477,354

UNITED STATES PATENT OFFICE.

MARSHALL E. HUNT, OF BELLE PLAINE, IOWA.

METHOD OF TREATING AND RESTORING USED STORAGE BATTERIES.

No Drawing.  Application filed October 27, 1922. Serial No. 597,394.

*To all whom it may concern:*

Be it known that I, MARSHALL E. HUNT, a citizen of the United States, residing at Belle Plaine, in the county of Benton and State of Iowa, have invented certain new and useful Improvements in Methods of Treating and Restoring Used Storage Batteries, of which the following is a specification.

This invention relates to an improved method of treating and restoring used storage batteries and consists in first placing the used plates, with vulcanized rubber fillers between them, between the jaws of a vice and applying pressure to these plates to closely press the active materials in close contact with the small wires running through the plates in order to make a perfect connection with and to all the small feeders; in then subjecting the positive plates of the battery to a strong and steady heat from gas or other sources in order to dry the plates thoroughly to the point where if continued, the heat would melt the active material of the plates, and in also subjecting the negative plates of the battery to heat of a less degree but sufficient to dry the same.

The old and common method of treating and restoring used batteries is to keep them in water or in a wet condition until they are re-built. My improved method of treatment is just the opposite, as it consists in drying them out thoroughly. As is well known, after the battery has been used until the plates become dead, the plates are of a blackish color and covered with a coating of a greasy nature, but by employing my improved method of treatment, this coating is not only thoroughly dried out, but the original reddish color of the plates is practically restored. Futhermore, as a result of my method of treatment, the operator is enabled to run the battery on a smaller quantity of distilled water, as compared with the amount used in the average new battery. The life of the battery is also lengthened from two to three years.

It is further claimed that the cells of used batteries when treated by my improved method, when put on a charging machine, almost always register the same strength, whereas, in batteries rebuilt in the old way, the cells do not come up even and generally one or more have to be separately charged in order to bring them all to the same strength. It is also claimed that the plates when treated by my method gain added amperage, making the batteries of larger amperage than they possessed when new.

Having described my invention, what I claim as new and desire to secure by Letters Patent, is:—

The herein described method of treating and restoring used storage batteries, consisting in first placing the used plates, with vulcanized rubber fillers between them, between the jaws of a vice and applying pressure and in then subjecting the positive and negative plates to heat sufficient to dry the same.

In testimony whereof I affix my signature.

MARSHALL E. HUNT.